United States Patent [19]

Moore

[11] Patent Number: 4,483,877
[45] Date of Patent: Nov. 20, 1984

[54] METHOD OF PRODUCING SILAGE

[75] Inventor: William P. Moore, Hopewell, Va.

[73] Assignee: Hawkeye Chemical Company, Clinton, Iowa

[21] Appl. No.: 460,824

[22] Filed: Jan. 25, 1983

[51] Int. Cl.$^3$ .......................... A23K 1/00; A23K 1/22; A23K 3/03
[52] U.S. Cl. ...................................... 426/54; 426/69; 426/335; 426/635
[58] Field of Search ................... 426/8, 49, 52, 53, 54, 426/69, 326, 331, 335, 635, 807; 71/28

[56] References Cited

U.S. PATENT DOCUMENTS

| 2,293,845 | 8/1942 | Millar | 99/2 |
| 2,579,609 | 12/1951 | Peebles et al. | 99/8 |
| 2,766,283 | 10/1956 | Darden | 426/69 |
| 3,063,839 | 11/1962 | Simonet et al. | 99/2 |
| 3,457,081 | 7/1969 | Freese | 99/8 |
| 3,934,041 | 1/1976 | Snyder | 426/69 |
| 3,942,970 | 3/1976 | O'Donnell | 71/12 |
| 3,976,465 | 8/1976 | O'Donnell | 71/13 |
| 4,057,392 | 12/1977 | O'Donnell | 23/259 |
| 4,081,366 | 3/1978 | O'Donnell | 210/10 |
| 4,089,899 | 5/1978 | Greidinger et al. | 71/28 |
| 4,173,582 | 11/1979 | Greidinger et al. | 71/28 |
| 4,304,588 | 12/1981 | Moore | 71/28 |

OTHER PUBLICATIONS

J. T. Huber and O. T. Santana, *Ammonia Treated Corn Silage*, Journal of Dairy Science, 55:489.

Primary Examiner—Raymond Jones
Assistant Examiner—Marianne S. Minnick

[57] ABSTRACT

An improved method of producing silage for use as ruminant feed, whereby green fodders are ensiled with about 1 percent of an additive containing methylolurea and methylenediurea in a weight ratio between 1 and 20 to 1, sufficient free urea to prevent reversion to free formaldehyde, a buffering agent to maintain pH, and water. The method preserves contained natural protein, substantially prevents growth of mold, and increases crude protein content, palatability, and feed efficacy. Operative feature of the method is the discovery that a methylolureamethylenediurea-urea solution may be reacted to a point where it will not sterilize the bacteria needed to ferment contained sugars to carboxylic acids, but will protect the silage against mold formation and natural protein degradation. A process for producing the required silage additive from urea, formaldehyde, ammonia, alkali, and water is provided.

19 Claims, No Drawings

METHOD OF PRODUCING SILAGE

BACKGROUND OF THE INVENTION

1. Field of the Invention

This invention relates to ruminant feeds and more particularly to a practical and inexpensive method for preserving the natural characteristics of ensiled fodders, while protecting the silage from deterioration and increasing its nutritive value.

2. Description of the Prior Art

Silage is widely used as a feed for ruminant animals such as cattle and sheep. It is produced by fermenting green fodders. The term fodders, as used herein, may be defined as any coarse vegetable material suitable for feeding to cattle. Particularly useful fodders include whole corn plant, corn stover, alfalfa, and other grasses.

A suitable green fodder, such as whole corn plant, is normally chopped and placed in a silo, a covered pit, or a package, to allow its conversion to silage. Initially, the plant cells of the fodder continue to respire, using the oxygen of the air entrapped in the fodder mass to form acids and to produce carbon dioxide. In a relatively short period of time, most of the oxygen is consumed. Depletion of the oxygen helps prevent the development of molds and other fungi.

Acid-forming bacteria multiply rapidly in the silage and attack the sugars contained in the fodder, producing carboxylic acids and some alcohol. The production of acid is important to the ensiling process because it prevents the growth of undesirable bacteria which cause putrefaction of the fodder. Palatability to the ruminant animal is best in feeds containing high proportions of lactic acid and low proportions of low molecular weight acids, such as acetic acid. The presence of these carboxylic acids is important to the palatability of the silage to ruminant animals.

Fermentation practically ceases when sufficient acid is formed, and if no air or other oxidizing agent is allowed to enter the ensiled mass of fodder, it will retain its nutritive value and palatability for long periods of time, such as a year or more. When air does penetrate to the ensiled fodder, mold and other fungi normally grow and destroy the contained acids, as well as the palatability of the silage. Putrefaction bacteria can then develop and cause further spoilage.

Air penetration into silage has long been a problem with the use of conventional silos, particularly at the surfaces of the silage and at cracks or openings in the silos. With the increased use of pits and other ensiling containers having low structural integrity, the intrusion of air and the degradation of ensiled fodders has become a more serious economical and animal health problem.

Most silages, including whole corn plant silage, contain some valuable natural protein, but usually contain less protein than is required for optimum ruminant growth. There has been a continuing scientific effort to overcome this deficiency, and to find a safe, economical, and effective silage preservative.

Freese, in U.S. Pat. No. 3,457,081, used ammoniated superphosphoric acid to produce a storage staple, palatable corn silage containing increased amounts of lactic acid. His process allowed the addition of urea and calcium carbonate, but did not teach the preservation of natural protein, prevention of molds, or the reduction of live microbial colonies in the silage.

Earlier Peebles et al in U.S. Pat. No. 2,579,609 had shown that dilute ammonia sprayed on leafy material immediately after field cutting was effective in preventing the deterioration of the carotene content in the ensiled material. No indication was presented of the natural protein preservation, nitrogen losses in the process, or the elimination of mold growth.

H. C. Millar, in U.S. Pat. No. 2,293,845, previously showed that fodders could be treated with ammonia at elevated temperature and pressure to increase crude protein content. Millar's treatment would appear to sterilize the fodders so that ensiling during or after the treatment could not be readily achieved. Huber and Santana in an article entitled "Ammonia Treated Corn Silage", published in the Journal of Dairy Science 55:489, showed that anhydrous ammonia could be used effectively in relatively small amounts to preserve corn silage and increase the crude protein content of the silage. However, they did not show that natural protein was effectively preserved, and that mold could be prevented. Handling anhydrous ammonia can be hazardous under conditions encountered during ensiling operations. Ammonia cannot be effectively used on fodders prior to their placement in an ensiling vessel because it is quickly lost by evaporation.

Simonet and Castle, in U.S. Pat. No. 3,063,839 claim the enhancement of naturally occurring crude protein, comprising amino acids and their complex products, such as peptides, by spraying freshly cut plant material with aqueous urea solutions just before drying at elevated temperatures. Carotene and Vitamin A were preserved. No teaching was made relative to silage, and ensiling of the dry plant material from their process was not suggested.

Snyder discloses a liquid ruminant feed supplement, in U.S. Pat. No. 3,934,041, which was prepared by the reaction of urea, formaldehyde and/or other aldehydes, molasses, and water. Snyder teaches the reaction of methylol ureas with sucrose under the influence of acid catalysts in the preparation of a liquid feed supplement. He does not propose the use of such a fluid in the preparation of silage and there is no indication that such would be effective.

O'Donnell, in U.S. Pat. No. 3,976,465 discloses a process for treatment of raw sewage or sewage sludge, containing pathogenic microorganisms, which are completely sterilized by treatment with a water soluble, monomeric, condensable methylol compound, and by condensing the monomeric methylol compound under acid conditions to form a waste product comprising a solid condensate having methylene bridges. O'Donnell found that it was necessary to pre-react the urea and formaldehyde to the methylol compound just prior to its use, rather than use an aged solution. All live microbes were eliminated in the process, so that fermentation and silage formation would not be possible using a similar procedure.

O'Donnell discloses, in U.S. Pat. No. 3,942,960 an apparatus for producing a granular, high nitrogen, odorless fertilizer animal feed by reaction of methylol urea with sterilized, partially dried, shredded sludge cake. He discloses further information on his waste treating and sterilizing process in U.S. Pat. No. 4,057,392 where he demonstrates sterilization and deodorization of sludge by treating it with N-methylol urea solution at a pH higher than 7, and then reacting the mixture at an acid pH of 3 to 5. No methylenediurea was present in O'Donnell's N-methylol urea solution. In U.S. Pat. No. 4,081,366 O'Donnell further elucidates his treatment of sewage sludge to produce a sterile solid hydrophobic waste with superior dewatering properties. He uses substantial amounts of freshly formed monomeric methylol urea solutions at pH 7 to 9 for complete sterilization of the wastes. The wastes treated include raw sewage sludge, raw sewage, solid carbohydrate and proteinaceous material recovered from industrial waste liquors from treatment of leather, wool, food, fish, meat, dairy products, and pharmaceutical wastes. Moore in U.S. Pat. No. 4,304,588 teaches a process for storage stable methylolurea-methylenediurea solution but discloses no information concerning possible use of this type solution as a silage preservative.

Thus, no teachings are available, or can be reasonably inferred, from the prior art, which would provide an economical method for the natural fermentation of fodders to palatable and efficaceous silages, while inhibiting the growth of mold, and substantially improving the nutritive value of the fodders. There is a need for the improvement of the nutritive values and palatability of silage and for inhibiting mold growth in silages while still allowing the silages to ferment naturally. This need has been made more urgent by the increasing use of the economical covered pits and large fodder bales instead of conventional cylindrical silos for carrying out the ensiling process of fodders for ruminant feeds. The term preservative used herein denotes a material which is added to fodder or silage in relatively small amounts to preserve the desirable nutritive and palatability properties of silage.

SUMMARY OF THE INVENTION

It is therefore a primary object of this invention to provide a method for ensiling fodders by the use of a preservative which permits the bacterial fermentation of the fodders to silage, but inhibits the growth of mold.

It is a further object of this invention to provide a method for preserving the natural protein content of the fodders.

It is a further object to provide a method for increasing the crude protein content of ensiled fodders.

It is a further object to provide a preservative for improving the ensiling of fodder, which preservative does not remain as a residue in the silage.

It is a further object to provide a method for producing a nutritionally improved ruminant feed from fodders.

It is a further object to provide a process for preparation of a storage stable preservative which makes the improved ensiling method operative.

The instant invention is a method of silage production utilizing a new preservative which inhibits mold growth, but promotes effective fermentation of fodders to silage having enhanced value as ruminant feeds. The natural protein content of ensiled fodder is substantially preserved and total crude protein content of the silage produced is increased. Surprisingly, the preservative is storage stable prior to its use, but is not found in the ensiled product.

The fodders ensiled by the improved method provide a palatable ruminant feed having improved efficacy. An effective method is provided for preparing the requisite preservative having sufficient strength to prevent mold growth in silage, but low enough in strength to permit the effective fermentation of the fodders. The term strength is used herein to indicate activity in killing or otherwise deactivating microorganisms, specifically bacterial colonies and mold-producing fungi.

In accordance with the instant invention, fodders are comingled and ensiled in an enclosed container with about 0.5 to 4.0 percent by weight of a preservative comprising: methylolurea and methylenediurea mixed in a weight ratio between about 1 and 20 to 1; free urea in an amount sufficient to prevent reversion of the methylolurea to free formaldehyde; an ammonia compound to prevent polymerization of the methylolurea and methylenediurea; an alkaline substance to adjust pH of the preservative to between 6 and 10; and water in an amount sufficient to liquify the preservative. The preservative is formed by heating a mixture of water, alkali, urea, and formaldehyde to about 75° to 100° C. for 20 to 300 minutes while maintaining pH between 8 and 11 until the reaction mixture contains no free formaldehyde and methylolurea and methylenediurea have been formed in ratios between 1 and 20 to 1, and until the strength of the reaction mixture has been reduced so that its presence at a 4 percent concentration will not substantially eliminate the colonies of live bacteria in silage. The amounts of urea and formaldehyde used to form the preservative are controlled to provide a free urea concentration of between 33 and 150 percent of the urea concentration combined as methylolurea and methylenediurea, and to produce a total nitrogen content of between 10 and 32 percent. The preservative may be used as produced, or stored for later use. It may be used in mixtures with water or other animal feed supplements.

DETAILED DESCRIPTION OF INVENTION

The instant invention is directed to a method of converting fodder to silage by ensiling with a new preservative. The amount of preservative must be controlled to between 0.5 and 4.0 percent of the treated fodder. All percentages and parts given herein are by weight unless otherwise specified. Ensiling with less than 0.5 percent preservative does not prevent mold growth on the silage, and more than 4.0 percent reduces the number of live bacteria colonies to a point where they are no longer able to ferment the sugars contained in the fodder, as required in the ensiling process. The use of between 1.0 and 2.0 percent preservative is preferred. In this range the production of nutritionally desirable lactic acid by fermentation of the contained sugars is maximized and low molecular weight carboxylic acids, such as citric are minimized.

To inhibit mold growth, preserve the natural protein content of the ensiled fodder without sterilizing the bacteria required for fermentation, the preservative must be specifically selected and carefully prepared. It was found that methylolurea, in practical concentrations required to preserve the natural protein and increase crude protein content in the silage, reduces the number of live bacteria colonies in treated fodder to a point where fermentation and the ensiling process virtually cease. The same effect was found with mixtures of urea, and ammonia with methylolurea. The sterilizing effect of methylolurea was especially strong when it was freshly formed from urea and formaldehyde.

It has now been discovered that these unacceptable properties of methylolurea may be changed to produce an effective new silage preservative by admixing methylolurea with methylenediurea in a methylolurea to methylenediurea ratio between about 1 and 20 to 1. The mixture of methylolurea and methylenediurea may be prepared by a simple blending of the chemical compounds, or it may be prepared by the reaction of urea and formaldehyde to produce the compounds in the necessary concentrations. It was found necessary to include free urea in the preservative in an amount sufficient to prevent the reversion of methylolurea to free formaldehyde because methylolurea will revert to free formaldehyde and urea particularly in the presence of water unless some chemical is added to prevent it. Formaldehyde is a strong bactericide which substantially stops fermentation even at low concentrations. Free urea amounting to less than 33 percent of the urea combined as methylolurea and methylenediurea does not shift the reaction equilibrium far enough from formaldehyde and undesirably allows the presence of some free formaldehyde to exist in the ensiling process, and free urea amounting to more than 150 percent of the combined urea allows excessive loss of urea by urease degradation. It has been found that the desired free urea concentrations may be formed from 1.3 to 2.5 urea moieties per formaldehyde moiety. This formation may be achieved by a simple blending of the requisite compounds, or by reacting urea and formaldehyde raw materials. The maximum nitrogen concentration in the preservative found to be practical is 32 percent. Higher concentrations have high viscosities when liquid, and may not be handled and distributed onto the fodder effectively, and undesirably have saltout temperatures above normal ambient temperatures. Preservatives containing below about 10 percent nitrogen are economically undesirable to ship or store. Nitrogen concentration between 20 and 30 percent are preferred. The preservative may be diluted and blended with wetting agents prior to its use to improve mixing with the treated fodder.

The methylolurea and methylenediurea components of the preservative have a tendency to react with each other to form polymeric chain compounds which are insoluble. It has now been found that the use of a small amount of an ammonia compound in the silage preservative is sufficient to act as a chain stopper and to prevent polymer precipitation in the preservative. The ammonia compounds found to function effectively are: ammonia, hexamethylene tetramine, ethanolamine and ethylamine. Ammonia is preferred because of its economical availability and the small amount required. Ammonia in amounts of less than 0.5 percent was found to provide storage stability in the preservative for less than 30 days, and concentrations above 1.5 percent, although providing long stabilities, undesirably caused strong ammonia odor in the treated silage. Concentrations between about 0.8 and 1.2 percent provided more than 6 months storage stability without causing undesirable ammonia odors in the treated silage.

The storage stability of the methylolurea and methylenediurea components of the preservative may be ruined in relatively short periods of time by the tendency of these compounds to form organic acids, which decrease pH of the preservative and cause the formation of insoluble solids. It has been found that an alkaline, pH modifying substance can be used to adjust the pH of the preservative solution to between 6 and 10 so that pH is substantially unchanged and no insoluble solids are formed in the preservative even if it is stored for 3 months or longer. The alkaline pH modifying substance is used to adjust pH to between 8.5 and 9.0 to achieve 6 months or longer storage stability. The pH modifying substances found to be especially effective are the salts of alkali metals, including potassium and sodium carbonates, and bicarbonates; potassium and sodium formates; and potassium and sodium phosphates. These buffering agents may be added during or after the reaction or may be formed in-situ. It was also found that alkali metal hydroxides could be used to control pH, but it was necessary to control the amount of these materials used more accurately than the salts. The use of alkaline earth carbonates, particularly calcium and magnesium carbonates were effective also, and provided a method of introducing these elements into the silage.

In the method of producing silage, it is necessary that the preservative be substantially blended with the fodder, and the use of the preservative in the liquid form was found to be the most effective way to achieve complete mixing. It is therefore necessary to include in the preservative composition, sufficient water to dissolve its methylolurea, methylenediurea, free urea, ammonia compound and pH modifying substance.

The preservative may be sprayed onto the fodder while it is being chopped or while it is being transported into the ensiling container, or after it reaches its storage point in the ensiling container. Surprisingly, the preservative has been found to be effective when it is applied to fodders prior to their ensiling. The preservative may be sprayed onto fodders as they are cut in a field. It has also been found possible to apply the preservative when it is applied to fodders still standing in a field, prior to harvesting.

Supplementary nutrients such as phosphates and minor elements are frequently added to silage to improve its nutritive value. It has been found that these materials may be effectively added to the silage by combining them with the preservative. It has been found best to add the supplementary materials shortly before the preservative is applied to the fodder.

Although the preservative used in the instant invention may be prepared by a simple blending of the necessary chemical compounds, it has been found that it may be prepared more economically by a process by which a mixture of water, caustic alkali (meaning alkali metal carbonates or hydroxides), urea, formaldehyde, and an ammonia compound are heated to a temperature of about 75° to 100° C., preferably 88° to 93° C., and holding those temperatures for 20 to 300 minutes, preferably between 45 and 75 minutes, while maintaining pH between 8.0 and 11.0, preferably between 8.5 and 9.5, until no free formaldehyde remains and methylenediurea has been formed in amounts so that the ratio of contained methylolurea and methylenediurea is between 1 and 20 to 1, and the sterilizing activity of the preservative is reduced to the point so that a 4 percent concentration will not substantially eliminate the live colonies of bacteria in the silage. It was discovered that carrying out the reaction until the indicated distribution between methylolurea and methylenediurea was reached was an effective way of achieving the desired reduced level of sterilizing activity. The reduced level of sterilizing activity was confirmed by counting the live bacterial colonies in samples of the treated silage. It was found that reduction of the live bacteria colonies to levels below 10 percent of those in silage not treated with preservative caused fermentation to proceed at an unsatisfactory rate and failure of the ensiling process. Where more than 10 percent of the bacterial colonies remained live, the ensiling method was successful. Substantial reduction in live bacterial colonies occurred when mold growth was inhibited and substantially eliminated. It is difficult and impractical to measure the reduction of live bacterial colonies present in each batch of material being ensiled, so that it is a considerable advancement in the art to be able to carry the process for making the preservative to the point where the readily measured and analyzed preservative solution has the desired strength. In the process for the preservative, the amounts of urea and formaldehyde used are controlled so that the free urea concentration in the preservative amounts to between 33 and 150 percent of the urea combined into methylolurea and methylenediurea, and so that the total nitrogen content of the preservative is not less than 10 percent and not more than 32 percent. The pH of the preservative is finally adjusted to between 7.5 and 10.5 by means of a pH modifying substance.

The caustic alkali used in the process may be added as a base buffering material and is preferably potassium carbonate in amounts between 1 and 6 percent of the preservative solution. The caustic alkali may be added incrementally as the process proceeds, to maintain pH in the desired range. The pH modifying material controlling the pH of the final preservative may be formed during the reaction from the caustic alkali used in the process. For example, buffer potassium bicarbonate may be readily formed during the reaction from potassium carbonate. It may be, if desired, be added as a ruminant nutrient such as potassium phosphate after the preservative preparation process is completed.

MODE OF OPERATION OF INVENTION

Having described the basic concepts of the instant invention, reference is now made to the following examples which are provided to illustrate the best method for carrying out the invention.

EXAMPLE 1

A silage preservative was prepared batchwise in a stirred stainless steel reactor equipped with a jacket and internal coils for heating and cooling. To this reactor were added, in the order listed, the following ingredients:

| Ingredients | Wt % |
|---|---|
| Water | 8.8 |
| $Na_2CO_3$ | 3.5 |
| Ammonia | 2.3 |
| Urea | 52.6 |
| 50% HCHO Solution | 32.8 |

These blended ingredients, including commercial urea and formaldehyde in a mol ratio of 1.6, had a pH of 10.7. The ingredients were agitated and heated until all ingredients were in solution, and the temperature reached 89° C. Cooling was applied as needed to maintain the temperature between 88° and 95° C. for a period of 60 minutes. At the end of this period the reaction mixture was cooled to ambient temperature of 32° C. in 27 minutes, and samples were withdrawn for evaluation. The pH was maintained between 8.5 and 10.5 during the reaction and stabilized at 9.1 by adding 1.0 percent of potassium phosphate at the completion of the reaction. Tests for the presence of free formaldehyde by the Bisulfite Method were negative after the 60 minute period.

A sample was withdrawn and analyzed by wet chemical and high pressure liquid chromatographic means, with the components found in the preservative listed as follows:

| Components | Wt % |
|---|---|
| Ammonia | 1.1 |
| Methylolurea | 36.1 |
| Methylenediurea | 4.0 |
| Urea | 28.1 |
| Sodium Bicarbonate | 5.5 |
| Water (by difference) | 25.2 |

Another four gram sample was blended with 100 grams of freshly chopped corn plant, and the mixture was enclosed in a plastic bag for 24 hours. A comparison was made of the number of live bacteria colonies in the blended sample with the number in a 100 gram sample of untreated chopped corn plant. The sample contained $1.5 \times 10^7$ live colonies per milliliter compared to $10 \times 10^7$ live colonies in the untreated fodder. Thus, although the number of live bacteria colonies was significantly reduced, the live colonies were not substantially eliminated.

The weight ratio of methylolurea to methylenediurea was 9.02 to 1. The free urea content amounted to 98 percent of the urea combined as methylolurea and methylenediurea, and was sufficient to prevent any reversion of those compounds to free formaldehyde during storage. Total nitrogen concentration was 26.7 percent in the preservative product. The preservative was stored in a steel tank and found to be clear and virtually unchanged in appearance, properties, and analysis after a period of 12 months.

EXAMPLE 2

The silage preservative from Example 1 was used in a method of ensiling fodder. Whole corn plants were selected as the fodder. They were cut from a single field in Central Ohio and taken to three plastic-lined pits, each having a capacity of about 50 tons. There the whole corn plant was chopped into approximately ¼" diameter pieces and conveyed directly, in about equal amounts, to the three plastic-lined pits for ensiling. No preservative was added to the fodder sent to the first pit. The liquid preservative from Example 1 was sprayed onto the fodder sent to the second pit. It was thoroughly blended with the chopped fodder as it was moved by a screw conveyor to the pit, the liquid preservative amounting to 1 percent of the fodder (20 pounds per ton). To the fodder sent to the third pit, 3 percent liquid preservative was in a like manner added. Polyethylene sheets were then used to cover the plastic-lined pits to form ensiling containers which limited air intrusion. Because of the relatively large surface to volume ratio, and the low integrity of the ensiling containers, air intrusion was significantly higher than in a conventional silo.

The whole corn plant fodder was thus ensiled and each pit warmed significantly after about 7 hours as fermentation of the contained sugar proceeded. Warming was most evident in the pit receiving no preservative, and least evident where 3 percent preservative was added.

Seven days after charging, counts were made of live colonies of bacteria in samples taken from each pit silo. The number of live colonies found per milliliter of the untreated fodder in the first pit, the fodder treated with 1 percent preservative in the second pit, and the fodder treated with 3 percent preservative in the third pit were: $14 \times 10^7$, $4 \times 10^7$, and $2 \times 10^7$, respectively. The ensiled fodders in each pit were monitored by visual inspection. Mold began to form on the untreated ensiled fodder within two weeks in pit silo 1, particularly near the outside of the polyethylene covering sheet where air intrusion was most pronounced. No mold formation was noted in the pits containing preservative. After 6 months storage, the ensiled corn plant silage was heavily covered with mold so that its market value was reduced. The pit receiving 1 percent silage preservative contained only small amounts of mold on the edge of the pile, amounting to 5 percent or less of the mold on the untreated fodder. The fodder receiving 3 percent of the preservative contained virtually no mold even in areas where significant penetration of air and moisture occurred.

Analyses were performed on the six-month old silage in each pit for natural protein using the Tungstic Acid Precipitation Method. The silage receiving no preservative contained 4.06 percent natural protein, on a dry basis; the silage treated with 1 percent preservative contained 6.9 percent natural protein; and the silage treated with 3 percent preservative contained 7.5 percent natural protein. Total available crude protein contents of the same silages were: 7.5, 9.5, and 13.4 percent, respectively, on dry bases. Total dry matters in the three silages were 33.0, 33.3, and 33.5 percent.

Carboxylic acid analyses were made on the silages from the three treatments by gas chromatography. The silage receiving no preservative contained 2.6 percent acetic acid, the silage receiving 1 percent preservative contained 1.1 percent acetic acid, and the silage receiving 3 percent preservative contained 0.5 acetic acid. The untreated silage contained 6.1 percent lactic acid compared to 7.7 and 8.1 dry basis percents, respectively, in the samples treated with 1 and 3 percent preservative.

Analyses were made by high pressure liquid chromatograph for methylolurea and methylenediurea in each of the silage piles. Neither compound was found in either the treated or untreated silage. The detection limit of the method is not known exactly, but when 50 parts per million of the compounds were added, they were readily determined quantitatively.

EXAMPLE 3

Silage prepared in pit 3 of Example 2, treated with 3 percent preservative, was used to feed a group of heifers and the performance of these heifers was compared with a group fed the same silage without preservative.

Two groups of 15 heifers were fed the silages four times per week on Monday, Tuesday, Thursday, and Saturday. The heifers fed the silage from Example 2 each received 675 pounds of silage and 50 pounds of vitamin and mineral supplement D-656, while the heifers receiving the untreated silage received 625 pounds silage, 50 pounds of the same supplement D-656, and 50 pounds of soybean meal to balance the protein content of each feed regimen, throughout the 10 week feeding period. The results obtained in the feeding tests, after 1 week period for feed accommodation, are listed as follows:

| Silage Source | Untreated | Example 2 Silage |
| --- | --- | --- |
| Amount of N, lbs/ton | 0 | 18 |
| Initial Weight of Heifers, Avg. lbs | 856 | 856 |
| Final Weight, Avg. lbs | 925 | 931 |
| Number of Days | 63 | 63 |
| Numbers of Animals | 15 | 15 |
| Average Daily Weight Gain, lbs/day | 1.10 | 1.19 |

Feed palatability of the silage from Example 2 was good and no difficulty was encountered in getting the heifers to consume it. Blood plasma derived from blood withdrawn from both herds was analyzed by high pressure liquid chromatography at maximum sensitivity and neither methylolurea or methylenediurea were found.

EXAMPLE 4

The preservative from Example 1 was applied to alfalfa in the field to preserve it through subsequent ensiling. The preservative from Example 1 was sprayed onto alfalfa as it was cut and thrown into wind rows near Scottsdale, Ariz., in April at 74° F. and conditions of high relative humidity. In a test area containing 3 long wind rows, 43.8 pounds of the preservative, containing 11.7 pounds nitrogen was applied per acre to 7500 pounds of alfalfa which formed 70 bales. The three wind rows on each side of the treated wind rows were not treated but were bailed and stored.

After 6 months stacked storage, the alfalfa bales ensiled with the preservative were free of mold and were readily accepted by feeding cattle. The untreated bales contained enough black mold to significantly reduce its acceptability as a feed. Total crude protein content of the preservative-treated bales averaged 23.6 percent compared to 20.2 percent for the untreated bales.

I claim:

1. A method of producing silage comprising: chopping fodder into small pieces; commingling the chopped fodder with about 0.5 to 4.0 weight percent of a preservative which permits fermentation and inhibits mold growth in the fodder, the preservative comprising,
    (a) methylolurea admixed with methylenediurea in a weight ratio between 1 to 20 to 1,
    (b) free urea in an amount sufficient to prevent reversion of methylolurea to free formaldehyde,
    (c) an ammonia compound in an amount sufficient to prevent polymerization of methylolurea and methylenediurea,
    (d) an alkaline, pH modifying, substance in an amount sufficient to adjust pH in the preservative to a value between 6 and 10,
    (e) and water in an amount sufficient to dissolve the methylolurea, methylenediurea, free urea, ammonia compound, and pH modifying substance;
enclosing the commingled fodder and preservative in a container which limits air intrusion; and storing the enclosed fodder for a period of time and under sufficient conditions for the sugars contained in the fodder to ferment, thereby forming desirable carboxylic acids.

2. A method of producing silage in accordance with claim 1 wherein the preservative contains between 10 and 32 percent by weight total nitrogen.

3. A method of producing silage in accordance with claim 1 wherein the preservative is formed from about 1.3 to 2.5 urea moieties per formaldehyde moiety.

4. A method of producing silage in accordance with claim 1 wherein the preservative contains free urea amounting to between 33 and 150 percent of the urea moieties combined as methylolurea and methylenediurea.

5. A method of producing silage in accordance with claim 1 wherein the ammonia compound is selected from the group consisting of ammonia, hexamethylene tetramine, ethanolamine, and ethylamine.

6. A method of producing silage in accordance with claim 1 wherein the ammonia compound is present in an amount between 0.8 and 1.2 percent.

7. A method of producing silage in accordance with claim 1 wherein the pH modifying substance is an alkali metal salt.

8. A method of producing silage in accordance with claim 1 wherein the pH modifying substance is an alkali metal hydroxide.

9. A method of producing silage in accordance with claim 1 wherein the pH modifying substance is an alkaline earth carbonate.

10. A method of producing silage in accordance with claim 1 wherein the pH modifying substance is used to adjust pH of the preservative to a value between 8.5 and 9.0.

11. A method of producing silage in accordance with claim 1 wherein the preservative is commingled with the fodder prior to chopping the fodder.

12. A method of producing silage in accordance with claim 1 wherein the preservative is commingled with the fodder while it is being chopped.

13. A method of producing silage in accordance with claim 1 wherein potassium phosphate is utilized as a supplementary nutrient.

14. A method of producing silage in accordance with claim 1 wherein the preservative is diluted and blended with a surfactant to improve mixing with the fodder.

15. A process for preparing a storage stable aqueous preservative for fodders, which comprises forming a solution of methylolurea, methylenediurea, free urea, ammonia, alkali salt buffer, and water, by heating a reaction mixture of water, caustic alkali, urea, formaldehyde, and an ammonia compound to a temperature of about 75° to 100° C., and maintaining the temperature for 20 to 300 minutes while maintaining pH between 8.0 and 11.0 until no free formaldehyde remains and methylenediurea has been formed in amounts of between 5 and 100 percent of methylolurea concentrations present, thereby reducing sterilization activity of the preservative so that the preservative admixed with silage at a 4 percent concentration will reduce the number of live colonies of bacteria in the silage by between 60 and 90 percent, amounts of urea and formaldehyde used in preparing the preservative being selected to provide a free urea concentration amounting to between 33 and 150 percent of the urea combined as methylolurea and methylenediurea and a nitrogen content not less than 10 percent and not more than 32 percent by weight, and pH of the preservative being maintained at between 7.5 and 10.5 by means of a pH modifying substance.

16. A process in accordance with claim 15, wherein temperature is between 88° and 93° C., holding time is between 45 and 75 minutes, and pH is between 8.5 and 9.5.

17. A process in accordance with claim 15 wherein the caustic alkali is potassium carbonate, amounting to between 1 and 6 percent by weight of the preservative.

18. A process in accordance with claim 15 wherein the caustic alkali is added incrementally.

19. A method of producing silage as an improved ruminant feed which comprises commingling a mixture of between 1.0 and 2.0 percent of a storage stable preservative, prepared in accordance with claim 15, with a fermentable fodder, and storing in an enclosed vessel at ambient pressure and temperature until fermentation is substantially complete and no methylolurea or methylenediurea residues remain in the fodder.

* * * * *